United States Patent
Stec (10) Patent No.: US 12,192,643 B2
(45) Date of Patent: Jan. 7, 2025

(54) METHOD AND SYSTEM FOR AUTOMATIC EXPOSURE AND WHITE BALANCE CORRECTION

(71) Applicant: Tobii Technologies Limited, Galway (IE)

(72) Inventor: Piotr Stec, Athenry (IE)

(73) Assignee: Tobii Technologies Limited, Galway (IE)

( * ) Notice: Subject to any disclaimer, the term of this patent is extended or adjusted under 35 U.S.C. 154(b) by 325 days.

(21) Appl. No.: 17/590,665

(22) Filed: Feb. 1, 2022

(65) Prior Publication Data
US 2023/0247304 A1    Aug. 3, 2023

(51) Int. Cl.
*H04N 23/73*    (2023.01)
*G06T 5/40*    (2006.01)
*H04N 23/55*    (2023.01)

(52) U.S. Cl.
CPC .............. *H04N 23/73* (2023.01); *G06T 5/40* (2013.01); *H04N 23/55* (2023.01)

(58) Field of Classification Search
CPC ........... H04N 23/73; H04N 23/55; G06T 5/40
USPC ......................................................... 382/169
See application file for complete search history.

(56) References Cited

U.S. PATENT DOCUMENTS

2016/0366386 A1\* 12/2016 Douady-Pleven ... H04N 25/672
2018/0097992 A1\* 4/2018 Douady-Pleven ..... H04N 25/61

\* cited by examiner

*Primary Examiner* — Michael R Neff
(74) *Attorney, Agent, or Firm* — Christopher Ignatius Moylan (57) ABSTRACT

An auto-exposure module determines a first set of exposure parameters to acquire a first image. The first image is acquired using the first set of exposure parameters. The module determines a target image histogram; calculates an image histogram based on intensity values of the pixels of the first image; determines an integral of the image histogram and of the target image histogram for a range of pixel intensity values; calculates a transfer curve for transforming the integral of the image histogram to match the integral of the target image histogram; calculates a slope of a line fitting at least a portion of the transfer curve; determines a correction factor based on the calculated slope; and adjusts the first set of exposure parameters according to the correction factor. A second image is then acquired using the adjusted first set of exposure parameters.

19 Claims, 5 Drawing Sheets

METHOD AND SYSTEM FOR AUTOMATIC EXPOSURE AND WHITE BALANCE CORRECTION

FIELD

The present invention relates to image exposure and white balance correction.

BACKGROUND

An image acquisition system uses a lens assembly to focus incoming light rays from a scene onto a surface of an image sensor. The image sensor converts the incoming light energy into electrical signals that are processed to produce an image of the scene. Each image is acquired by exposing the surface of the image sensor to the focused incoming light rays for a certain amount of time ($T_{EXP}$). The responsiveness of the sensor to incident light is determined by the gain (G) of processing circuitry connected to the sensor. The amount of light incident on the surface can also be controlled by varying a size of an aperture (A) of the lens assembly and indeed illumination of the scene can be improved through actuating a flash with a given intensity (I) during the exposure time of the image.

A typical auto-exposure module of such an image acquisition system can determine a set of exposure parameters T, G, A, I, including at least a combination of the exposure time T and sensor gain G, to provide a suitable exposure level allowing, for example, a certain average level of brightness (within the exposure range of the image sensor) over the area or a region of interest of the image sensor. Other auto-exposure systems can attempt to identify a set of exposure parameters providing maximal contrast between image intensities with minimal saturation of the image. It will be appreciated that still further variations of these techniques can be employed.

Once an image has been acquired, it can be desirable to apply histogram matching to the acquired image to obtain an adjusted image with an image histogram closer to a model image histogram. One such model histogram comprises a uniform distribution of intensities in an adjusted image. In such a case, histogram equalization can equalize the tonal distribution of an acquired image (thus improving the contrast of the image, especially when the image pixels are represented by a narrow range of intensity values).

Nonetheless, as a digital process, such histogram adjustment tends not to improve the quality of raw image information acquired by the image acquisition system.

SUMMARY

According to a first aspect of the present invention there is provided a method according to claim 1.

According to a second aspect there is provided a method for automatic exposure correction according to claim 14.

According to a third aspect there is provided a method for automatic white balance correction according to claim 17.

There are also provided related image acquisition systems and computer program products according to claims 12-13, 15-16 and 18-19.

Embodiments of the invention use histogram adjustment to calculate a correction to a camera's exposure parameters and use this as a part of automatic exposure correction process.

Embodiments of the invention are based on determining a transfer curve for mapping a cumulative image histogram for a first acquired image to corresponding target cumulative histogram. Embodiments determine a straight line that best fits at least a portion of the transfer curve and the slope of the straight line indicates a correction factor which an auto-exposure module can apply for adjusting the set of exposure parameters used to acquire the first image, in order to acquire a second subsequent image with an image histogram closer to a target image histogram.

The above outlined principal based on a single histogram for a first image in order to improve a set of exposure parameters for acquiring a second subsequent image can be extended to analyzing respective histograms for separate color planes of a first image in order to individually adjust sensor gains for each color plane of a second subsequent image in order to better white/color balance the second image and compensate for mismatches between the histogram distributions of the image color planes as a result of the light source(s) illuminating a scene (e.g. an artificial light, like a flash light or a fluorescent light).

Note that such white balance correction can be employed in parallel with exposure adjustment or independently of exposure adjustment.

Thus exposure adjustment can be performed between acquiring a first and a subsequent second image, while white balance for adjusting gain can also be performed between acquiring said first and second images, or white balance can be performed between acquiring said second or any subsequent image and a still further acquired image.

In some of these embodiments, the linear fitting is advantageously limited to those portions of the transfer curves that are for transforming, towards the target image histogram, the portions of the histogram distributions corresponding to the brightest pixels in the image(s), since the brightest parts of the captured scene convey most of the information about the light color illuminating scene. For example, line fitting can be applied only on the portions of the transfer curves included within a range of pixel intensity values between about 200 and 255, for an 8-bit pixel intensity range between 0 and 255.

BRIEF DESCRIPTION OF THE DRAWINGS

Embodiments of the invention will now be described, by way of example, with reference to the accompanying drawings, in which.

DETAILED DESCRIPTION

Figure 1:
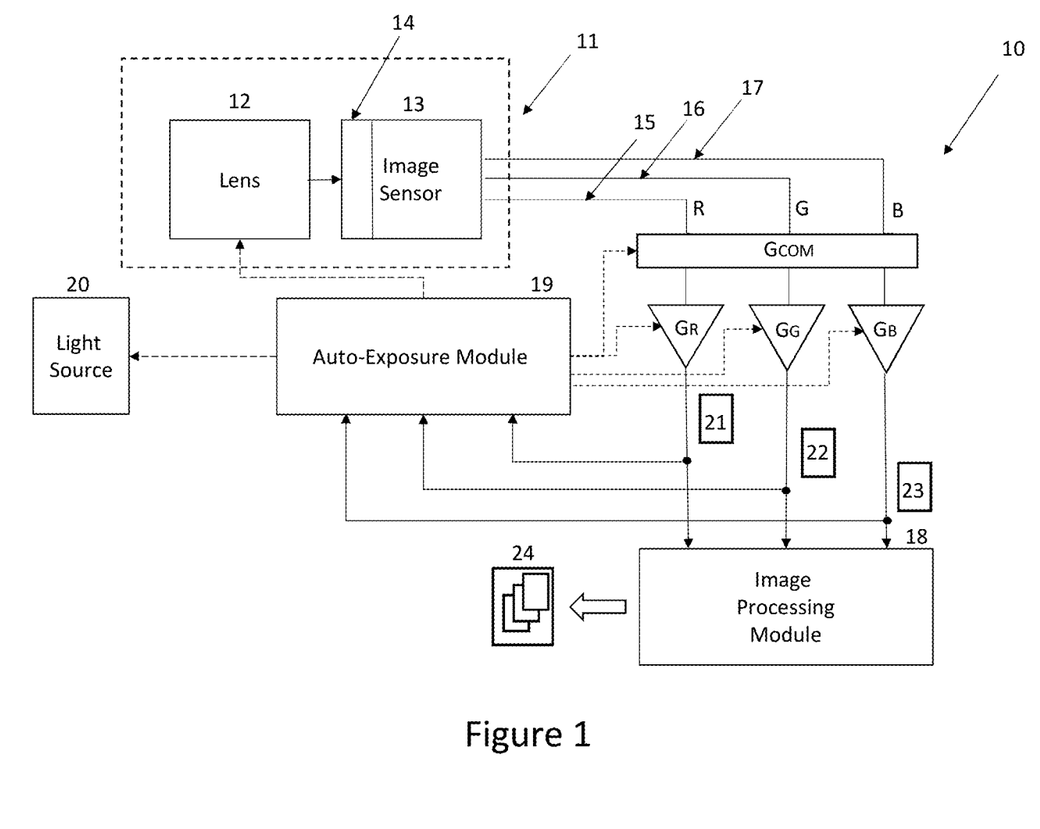
FIG. 1 illustrates an image acquisition system for auto exposure and white balance correction according to an embodiment of the present invention.

Referring now to FIG. 1, there is shown an image acquisition system 10 configured to operate according to an automatic exposure and white balance correction method according to an embodiment of the present invention.

The system 10 comprises a camera module 11 including a lens assembly 12, (referred to herein as a lens), which can have a variable aperture, and an image sensor 13. A Bayer filter 14 is arranged over the surface of the image sensor 13. In particular, the Bayer filter 14 includes an array of red (R), green (G) and blue (B) filters (with a proportion of two G filters for each R and B filter) allowing, respectively, red, green and blue components of incoming light focused by the lens 12 to reach respectively filtered pixel areas of the sensor surface.

The system 10 further comprises:
- a R channel 15 operatively connected to the sensor pixel areas covered by the R filters and configured to read, during image acquisition operated by the system 10, the electrical charge generated by the sensor pixel areas covered by the R filters in order to provide a raw R-plane image 21 of the scene (i.e. a monochrome intensity image 21 including a plurality of pixels, each pixel being associated with a single intensity value that represents how bright the pixel is the R image plane),
- a G channel 16 operatively connected to the sensor pixel areas covered by the G filters and configured to read, during image acquisition operated by the system 10, the electrical charge generated by the sensor pixel areas covered by the G filters in order to provide a raw G-plane image 22 of the scene (i.e. a monochrome intensity image 22 including a plurality of pixels, each pixel being associated with a single intensity value that represents how bright the pixel is the G image plane), and
- a B channel 17 operatively connected to the sensor pixel areas covered by the B filters and configured to read, during image acquisition operated by the system 10, the electrical charge generated by the sensor pixel areas covered by the B filters in order to provide a raw B-plane image 23 of the scene (i.e. a monochrome intensity image 23 including a plurality of pixels, each pixel being associated with a single intensity value that represents how bright the pixel is the B image plane).

It will be appreciated that in variants of the illustrated embodiment, more, fewer or different image planes can be employed. For example, where an image sensor includes pixels which are sensitive to infra-red light, then an IR image plane can be employed. Other image sensor may have in addition to RGB sensors or instead of RGB sensors, either pixels which are sensitive to only a narrow band of light or for example a broadband, such as visible light, referred to herein as white (W) pixels. In still further variations, the image sensor can comprise a hyperspectral sensor with separate planes sensitive to sub-bands of red, green or blue light or indeed separate bands of infra-red light.

Other image sensors include for example, sensors with an RGBE filter (similar to a Bayer filter but with added "emerald" filters, associated with an "emerald" channel), or a CYYM filter (having an array of cyan, yellow and magenta, associated with corresponding cyan, yellow and magenta channels). Furthermore, instead of using a CFA:
- the image sensor can be manufactured in such a way as to include by itself areas with different sensitivity to the different color components of the incoming light; or
- an arrangement can be employed whereby incoming light is split into a plurality of color components each directed towards a corresponding sensor surface (associated with a corresponding color channel).

The system 10 further includes an image processing module 18 connected to the R, G, B channels 15-17 and configured to combine, during image acquisition operated by the system 10, the raw R, G, B images 21-23 acquired via the R, G, B channels 15-17 so as to generate a corresponding RGB image 24 (i.e. a multiplane image 24 including a plurality of pixels, each pixel being associated with three intensity values that represent how bright the pixel is in the R, G and B image planes). For example, the image processing module 18 can be configured to convert the raw image data captured via the R, G, B channels 15-17 into the RGB image 24 by demosaicing. Furthermore, the image processing module 18 can be configured to convert the RGB image 24 into a YUV image, including an intensity plane (Y) along with two chroma planes (U, V) (or into any other image format associated with a color space different than RGB).

Preferably, the system 10 further includes a light emitting source 20 for illuminating a scene within the field of view of the camera module 11, is e.g. a flash. The light emitting source 20 is controllable in such a way as to adjust the intensity of the emitted light.

The system 10 further includes an auto-exposure module 19 configured to control the exposure of the R, G, B images 21-23 and the corresponding RGB images 24 acquired by the system 10. In particular, the auto-exposure module 19 is configured to:
- adjust a set of exposure parameters for acquiring RGB images 24 with an equalized distribution of brightness levels within the exposure range of the image sensor 13. The adjusted set of parameters includes a combination of at least: an exposure time for acquiring the images, $T_{exp}$, a lens aperture, A, an intensity of the light emitting source 25, I, and a common gain, $G_{COM}$, equally applied to each of the R, G, B channels 15-17 (in a digital and/or analog way). This will be referred to herein as "auto-exposure" or AE.
- Individually adjust a set of gain channels $G_R$, $G_G$, $G_B$ (separately applied to each of the R, G, B channels 15-17, in a digital and/or analog way) for acquiring white balanced RGB images 24. An instance of analogue control of the gains $G_{COM}$, $G_R$, $G_G$, $G_B$ includes controlling the gain of the amplifiers employed in the R, G, B channels 15-17 to read the charge generated by the associated sensor pixel areas or the digital amplification of the corresponding color channels. This will be referred to herein as "automatic white balance" or AWB.

The configuration and functionality of the system 10, and especially of the auto-exposure module 19 will be described with reference to the method 100 illustrated in FIG. 2.

In particular, the operation of the method 100 starts with the acquisition, via the image sensor 13 and the R, G, B channels 15-17, of first R, G, B images 21-23 (step 101), that are combined by the image processing module 18 to obtain a first RGB image 24.

In particular, the first R, G, B images 21-23 and the corresponding RGB image 24 are acquired using a first set of exposure parameters proposed by the auto-exposure module 19, including a combination of at least: a first exposure time, $T_{exp1}$, a first lens aperture, $A_1$, a first intensity, $I_1$, of the light emitting source 20, a first common gain, $G_{COM1}$, associated with the R, G, B channels 15-17, and first channel gains $G_{R1}$, $G_{G1}$, $G_{B1}$.

For example, assuming that the first acquired RGB image 24 is an initial image of a sequence images of a captured scene, the auto-exposure module 19 can propose the initial exposure parameters so as to acquire the first RGB image 24 with an exposure level that allows a significant portion of the image pixels to have a certain desired level of brightness within the exposure range of the sensor 11 or a desired brightness distribution.

Figure 2:
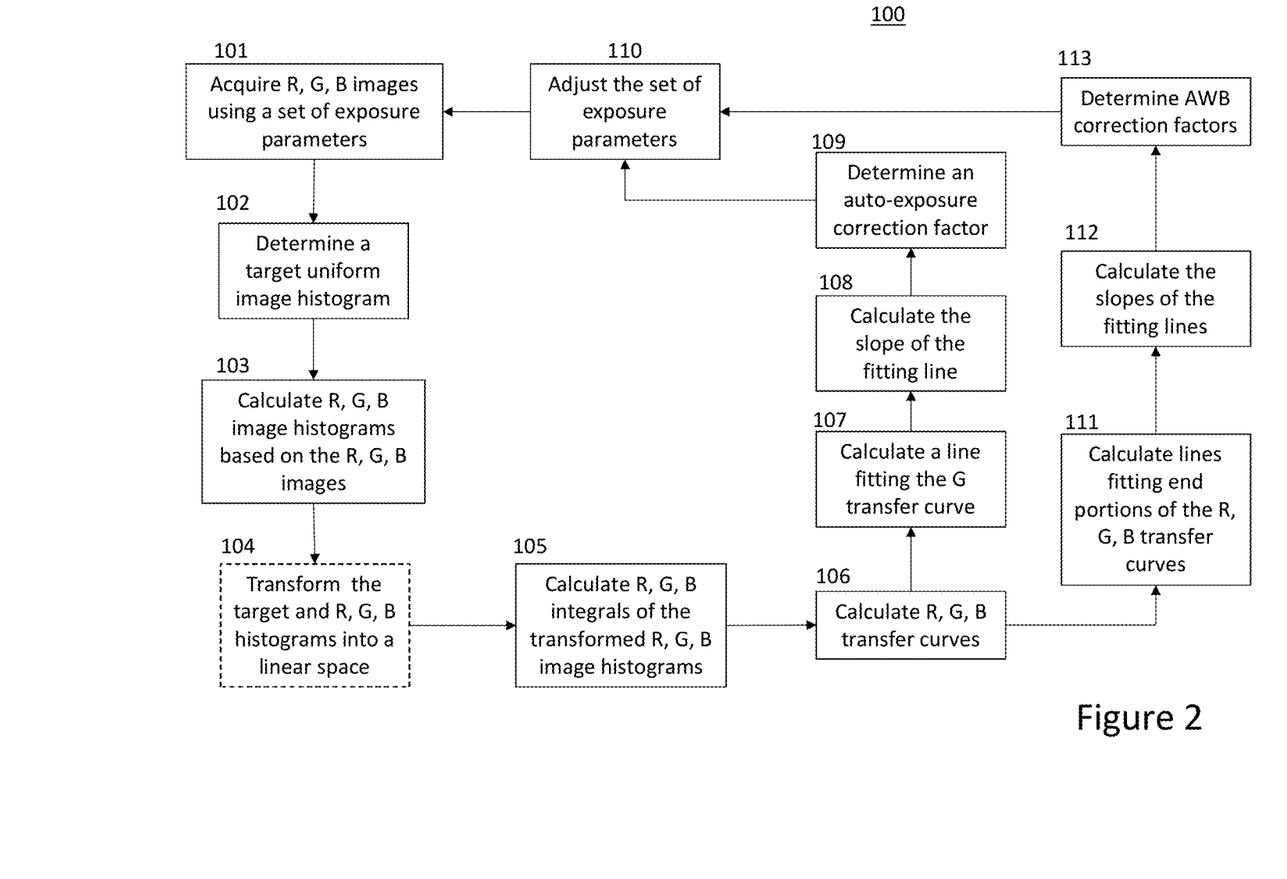
FIG. 2 illustrates a method that can be operated by the system of FIG. 1 for auto exposure and white balance correction according to an embodiment of the present invention.
Figure 3A:
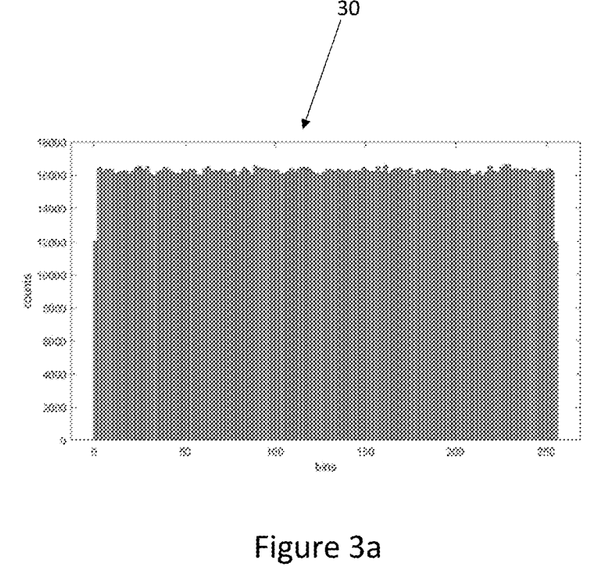
FIGS. 3a and 3b illustrate respectively a target uniform image histogram and its transformed version into a linear space, that are determined according to the operation of the method of FIG. 2.

After image acquisition at step 101, the auto-exposure module 19 determines a target uniform image histogram 30 (step 102), such as a uniform image histogram 30 illustrated for example in FIG. 3a. The uniform image histogram 30 corresponds to an ideal image with an optimally equalized distribution of pixel intensity levels (optimal contrast) within the exposure range of the image sensor 13, and represents an ideal target histogram distribution to be achieved in the standard RGB space, sRGB, (or other RGB space) by a second RGB image 24 acquired after the first RGB image 24. Nevertheless, it is to be noted that the target image histogram can be different than a uniform image histogram, and can represent any other desired histogram distribution corresponding to an ideal image or even a real image acquired by or provided to the system 10.

The auto-exposure module 19 calculates R, G, B image histograms (step 103) based respectively on the intensity values of the pixels of the first R, G, B images 21-23 (expressed as 8-bit integer, giving a range of possible values from 0 to 255). In practice, each of the calculated R, G, B image histograms represents the distribution of the image pixels as a function of their intensity values, by providing the counts of pixels (y axis) falling into each of a plurality of pixel intensity intervals (bins on the x axis).

Figure 3B:
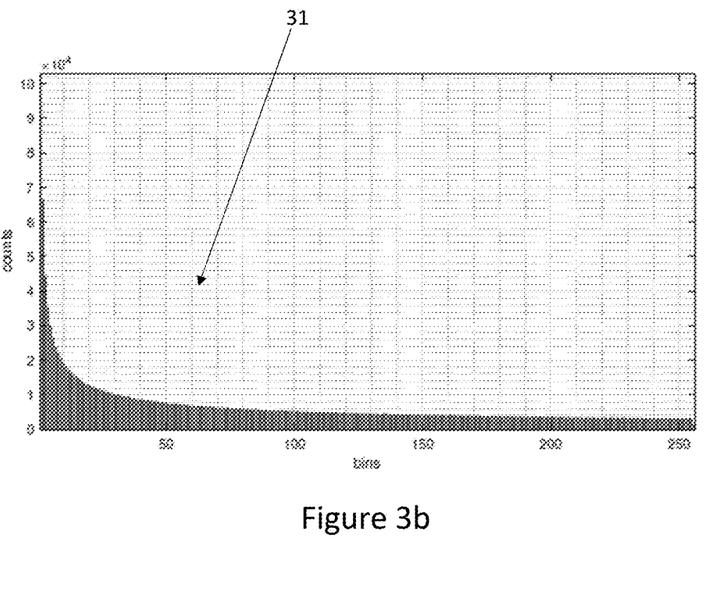

Preferably, the auto-exposure module 19 transforms each of the determined uniform image histogram 30 and R, G, B image histograms into a linear space (step 104). FIG. 3b illustrates for example a linearly-transformed version 31 of the uniform image histogram 30.

Figure 4:
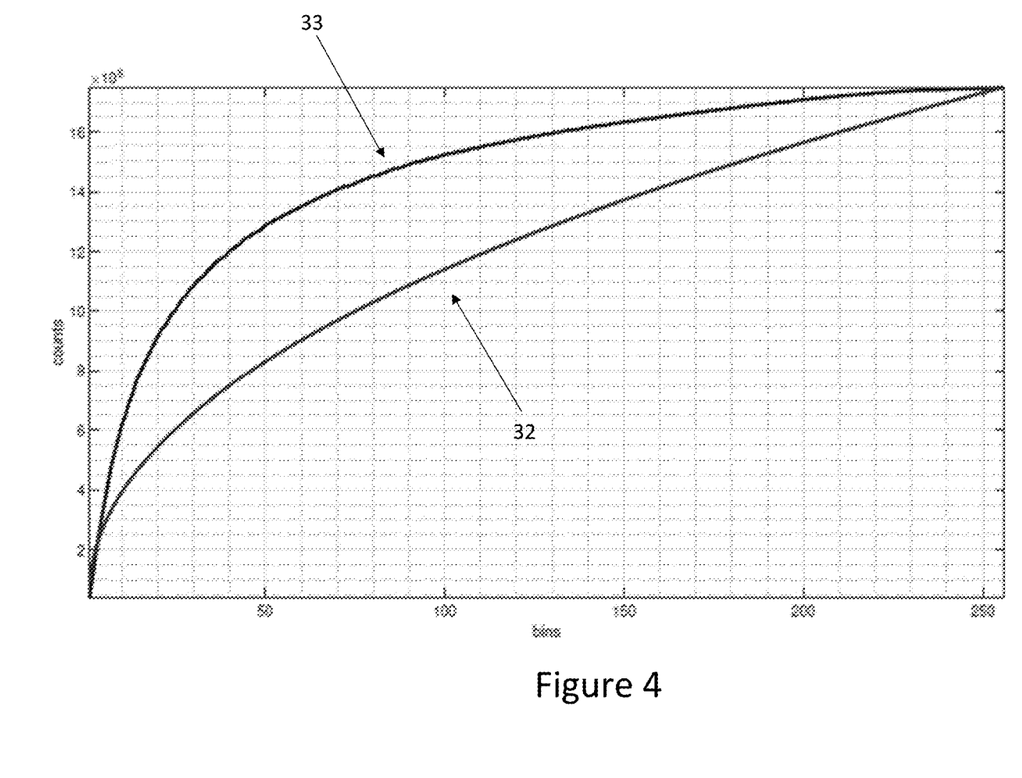
FIG. 4 illustrates: an integral of the uniform image histogram in the sRGB space that was transformed to the linear space illustrated in FIG. 3b, and an integral of an image histogram determined based on the pixel intensity values of an acquired green image, after its conversion in the linear space (in case of non-linear sensor response), to be matched with the integral of the transformed target uniform image histogram according to the operation of the method of FIG. 2.

After step 104, where applied, the auto-exposure module 19 determines an integral of the linearly-transformed target uniform image histogram 31 along with integrals of the linearly-transformed R, G, B image histograms (hereinafter indicated for simplicity as "target integral" and "R, G, B integrals", respectively) over a range of bins of the histograms (step 105). In practice, the determined target and R, G, B integrals represent cumulative versions of the corresponding target and R, G, B image histograms in the linear space (where the y axis of these cumulative versions does not just give the counts of image pixels for each bin, as in an ordinary image histogram, but for a given bin rather comprises the cumulative count of pixels in all the bins up to the given bin). FIG. 4 illustrates the target integral 32 along with the calculated G integral 33 in the cumulative linear space.

It should be noted that as the target integral is constant it does not need to re-calculated from scratch during each iteration of the method 100.

The auto-exposure module 19 then performs histogram specification on each of the R, G, B integrals with the purpose of calculating (step 106) transfer curves for transforming each of the R, G, B integrals to match the target integral 32 (hereinafter indicated for simplicity as "R, G, B transfer curves"). In practice, the cumulative distribution 32 of the linearly-transformed uniform image histogram 31 becomes the target, in the cumulative space, for histogram specification operated on the R, G, B histograms, in view of calculating the R, G, B transfer curves.

Figure 5:
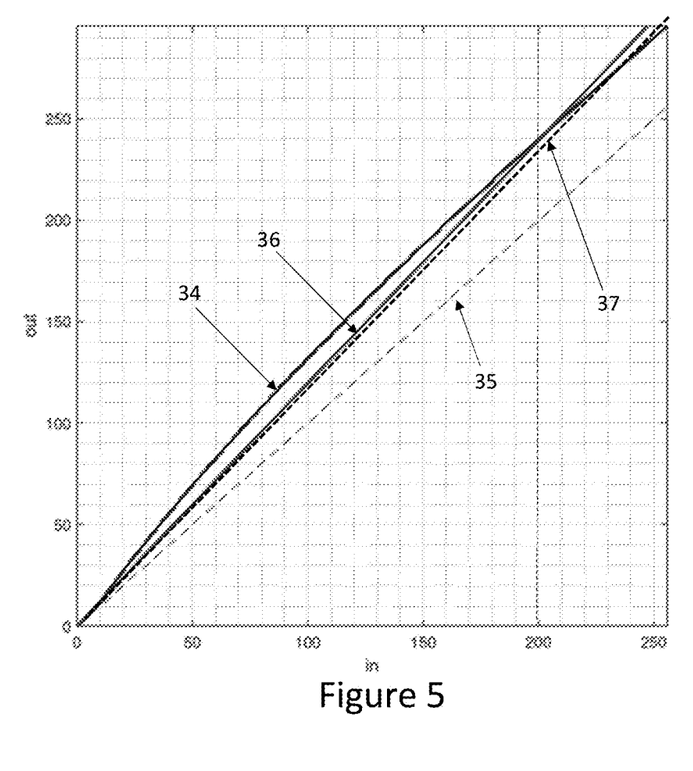
FIG. 5 illustrates: a transfer curve for matching the integrals illustrated in FIG. 4, a first straight line fitting the transfer curve according to the operation of the method of FIG. 2 for automatic exposure correction, and a second straight line fitting an end portion of the transfer curve according to the operation of the method of FIG. 2 for automatic white balancing correction.

For example, FIG. 5 illustrates the G transfer curve 34 calculated for matching the G integral 33 with the target integral 32 illustrated in FIG. 4. In particular, almost all the values of the G transfer curve 34 are above the identity transform 35, meaning that there is a positive correction to be applied for almost the input pixel intensity values in order to obtain corresponding output pixel intensity values suitable for transforming the G integral 33 so as to match the target integral 32. The value of the correction, corresponding to the derivative of the transfer curve 34, is continuously changing depending on the value of the input pixel levels.

With reference back to step 104, the transformation of the R, G, B histograms into the linear color space, where pixel intensity values can be added correctly during the calculation of the corresponding R, G, B integrals, advantageously improves the accuracy in determining the R, G, B transfer curves via histogram specification. Nevertheless, it will be appreciated that some embodiments can omit that operation of step 104, relying on the intrinsic level of linearity of the image sensor 13 in acquiring the first R, G, B images 21-23.

Focusing now to the operation of the method 100 to perform auto-exposure, the auto-exposure module 19 proceeds by: calculating a straight line 36 that best fits the G transfer curve 34 (step 107), and calculating a slope of the fitting line 36 (step 108). For example, the slope of the fitting line 36 can be calculated using a partial linear regression (calculation of an intercept value is not needed). In particular, considering the indices to the G transfer curve 32 (input pixel intensity values) as x and the output values according to the G transfer curve (output pixel intensity values) as y, the slope k can be calculated as:

$$k = \frac{xy}{x^2}$$

Since the calculated slope k is a constant value in the input/output space that minimizes the squared error between the fitting line 36 and the fitted G transfer curve 34, the auto-exposure module 19 determines k to be an auto-exposure correction factor (step 109) directly applicable to adjust the combination of initial exposure parameters $T_{exp1}$, $A_1$, $I_1$ and $G_{COM1}$ used in common between the R, G, B channels 15-17 for acquiring the first R, G, B images 21-23 and the corresponding first RGB image 24, when acquiring a second subsequent RGB image 24 with a more equalized tonal distribution.

Thus, the auto-exposure module 19 adjusts the combination of $T_{exp1}$, $A_1$, $I_1$ and $G_{COM1}$ according to k (step 110). For example, k can be applied to a selected one of $T_{exp1}$, $A_1$, $I_1$ and $G_{COM1}$ (if a maximum permitted value for the selected parameter is not exceeded—e.g., in the case of $G_{COM1}$, $A_1$ or $I_1$, a maximum gain value for the sensor circuitry, maximum aperture or maximum flash intensity; or in the case of $T_{exp1}$, a maximum exposure time longer than which the image would become subject to motion blur), or K can be divided across a plurality of correction factors each applied to at least two selected parameters among $T_{exp1}$, $A_1$, $I_1$ and $G_{COM1}$ (in such a way as that the adjusted selected parameters do not exceed their corresponding maximum values).

For example, the auto-exposure module 19 can give precedence to applying K to the combination of $A_1$, $I_1$, $G_{COM1}$ without modifying $T_{exp1}$, and if this attempt fails (e.g., because it would cause at least one of $A_1$, $I_1$, $G_{COM1}$ to exceed the maximum permitted value), the auto-exposure module 19 can apply K to the combination of $A_1$, $I_1$, $G_{COM1}$ along with $T_{exp1}$.

It will be appreciated that as an alternative to determining the auto-exposure correction factor as directly corresponding to the calculated slope k of the G curve 34, the auto-exposure module 19 can determine the auto-exposure correction factor as a function depending on the calculated slope k.

Furthermore, it will be appreciated that in some embodiments the system 10 might not include a lens 12 with variable aperture and/or a controllable light emitting source 20. As such, in these embodiments the calculated auto-exposure correction factor is used to adjust a combination of one or both of $T_{exp1}$ and $G_{COM1}$.

With reference back to step 106 and focusing on the operation of the method 100 to perform AWB, the auto-exposure module 19 proceeds by: calculating straight lines that best fit corresponding end portions of the calculated R, G, B transfer curves (step 111), and calculating the slopes of the fitting lines (step 112). In particular, the fitted end portions of the R, G, B transfer curves are limited within a range of input pixel intensity values between about 200 and 255—although it will be appreciated that this range of interest could vary. For example, FIG. 5 illustrates a fitting line 37 obtained by operating linear fitting limited to the end portion of the G transfer curve 34 within the range of pixel intensity values between 200 and 255 (this line is quite similar in slope, being slightly lower, to line 36).

In particular, the operation of method steps 111-112 is based on the appreciation that a mismatch between the brightest portions of the R, G, B integrals (i.e. the portions of the R, G, B integrals over a pixel intensity value range between 200 and 255) mostly depends on the color of a light source illuminating the scene and reflected by white or shiny objects within the illuminated scene (rather than depending on the color of the objects within the scene or other scene content). For example, if a blue light source is illuminating the scene, the B integral will show a greater number of counted pixels over the intensity value range 200-255, than the R and G integrals.

Thus, the slopes of the lines fitting the end portions of the R, G, B transfer curves represent constant gain values accurately determined for changing the brightest portions of the R, G, B integrals to match a corresponding portion of the same target integral, thus compensating any mismatch between these portions that are due to the presence of a colored light source (without taking into account mismatches between the R, G, B integrals that are due the color of the objects within the scene or other scene content).

According to alternative embodiments, the linear fitting can be operated along the R, G, B curves in their entirety. However, in these embodiments the values of the gains calculated as the slopes of the fitting lines might be influenced by the colors of the objects/elements within the scene. It is to be further noted that according to these alternative embodiments, the method steps 111-112 illustrated in FIG. 2 will require only the calculation of the lines fitting the R and B transfer curves in their entirety and of their slopes, since the line fitting the G transfer curve 34 in its entirety and its slope are already calculated according to the operation of method steps 107 and 108 for auto-exposure correction.

After step 112, the auto-exposure module 19 determines (step 113) the calculated slopes to be AWB corrections factors suitable for being applied to the initial channel gains $G_{R1}$, $G_{G1}$, $G_{B1}$ used to acquire the first R, G, B images 21-23, when acquiring a second subsequent RGB image 24 with improved white balance.

Thus, the auto-exposure module 19 adjusts $G_{R1}$, $G_{G1}$, $G_{B1}$ according to the AWB correction factors (step 110). In particular, at step 110 the auto-exposure module 19 adjusts the initial channel gains $G_{R1}$, $G_{G1}$, $G_{B1}$ as follows:

$G_{R2}=k_R G_{R1}$ $G_{G2}=k_G G_{G1}$ $G_{B2}=k_B G_{B1}$ where $K_R$, $K_G$, $K_B$ are the slopes of the fitting lines calculated at step 112.

To limit interference with the adjustment of the combination of initial parameters $T_{exp1}$, $A_1$, $I_1$, $G_{COM1}$, operated in parallel at step 110 according to the auto-exposure correction factor determined at step 109, while preserving the relative gains between the R, G, B channels 15-17, the auto-exposure module 19 further normalizes at step 110 the adjusted gain channels $G_{R2}$, $G_{G2}$, $G_{B2}$ as follows:

$M=\min(G_{R2},G_{G2},G_{B2})$ $G_{R2}'=G_{R2}/M$, $G_{G2}'=G_{G2}/M$, $G_{B2}'=G_{B2}/M$.

It will be noted again that as an alternative to determining the AWB correction factors as directly corresponding to the calculated slopes $K_R$, $K_G$, $K_B$, the auto-exposure module 19 can determine the AWB correction factors as a function depending on the calculated slopes $K_R$, $K_G$, $K_B$.

After step 110, the method 100 returns to step 101, where the system 10 uses the exposure parameters adjusted according to the auto-exposure and AWB correction factors to acquire second R, G, B images 21-23 via the R, G, B channels 15-17 along with a corresponding second RGB image 24.

It will be appreciated that the correction factors and adjusted exposure parameters determined according to the method of FIG. 2 are based on the assumption that the scene, scene illumination or user requirements do not change between acquisition of the first image and the second subsequent image. However, if for example, there is a step change in the brightness conditions of the scene being imaged or an external command is received through user interaction with the device, then the adjusted parameters may be superseded.

It will also be appreciated that in a typical implementation, the method 100 will run repeatedly or possibly periodically, although not necessarily for every image acquisition. As such, the adjustment of the exposure parameters indicated by the calculated correction factor (either globally and/or to the individual gain channels) can be controlled so that it is applied over a number of image acquisitions as well as potentially being further controlled by successive iterations of the method 100. So for example, the adjustment of the exposure parameters can be tracked over each iteration of the method and if desired, low-pass filtering can be applied to the adjusted exposure parameters determined at step 110 for smoothing out the adjustment of the exposure parameters across a number of subsequent frame acquisitions (thus minimizing image flickering or other undesired effects in successively acquired images). So the adjustment of exposure parameters determined after a given iteration of the method 100 can be applied across successive image acquisitions as well as being controlled by subsequent iterations of the method 100.

It will be appreciated that in steps 102-109 of the method 100, the auto-exposure correction factor is determined by performing histogram specification based on a G image plane 22 and calculating the slope of the line fitting the resulting G transfer curve 34. This is because, typically, the G channel 16 is more sensitive to incoming light than the R and B channels 21, 23. Thus, it is assumed that if the G channel does not unduly saturate in response to an adjustment indicating an increased exposure level, neither will the R or B channels.

Nevertheless, it will be further appreciated that the auto-exposure correction factor can be determined as per an operation similar to the operation of steps 102-109, but wherein histogram specification for determining a transfer curve is performed based on the pixel intensity values of either:
the first acquired R image 21;
the first acquired B image 23; or
each of the first acquired R, G, B images 21-23.

In the last case, the auto-exposure correction factor could be determined as per an operation similar to the operation of steps 102-109, but wherein histogram specification for determining a transfer curve is performed based on the pixel intensity values within a Y plane of a YUV image obtained by a converting the first acquired RGB image 24 into a YUV format.

Furthermore, it will be appreciated that, although in the above disclosed operation of the method 100, the determination of the auto-exposure correction factor and the AWB correction factors occur in parallel between the acquisition of the first RGB image 24 and the acquisition of a second subsequent RGB image 24, the determination and application of the auto-exposure correction factor and of the AWB corrections factors can occur separately between different image acquisitions.

For example, the AWB correction factors can be periodically determined and applied between image acquisitions within a sequence of image acquisitions, while the auto-exposure correction factor can be determined and applied between each of the image acquisitions of the sequence except between those image acquisitions where AWB correction is determined and applied.

Accordingly, with reference back to the method 100 illustrated in FIG. 2, in some embodiments:
only the auto-exposure correction factor is determined after acquisition of the first RGB image 24 and applied to correct the combination of initial exposure parameters $T_{exp1}$, $A_1$, $I_1$, $G_{COM1}$ (as per operation of method steps similar to steps 102-110 of method 100, but wherein only the calculations of the G image histogram, the G integral and the G transfer curve are required), in view of acquiring the next second RGB image 24; and
only the AWB correction factors are determined after acquisition of a third RGB image 24 (corresponding to the second RGB image 24 or a subsequently acquired image) and applied to correct the channel gains $G_R$, $G_G$, $G_B$ used to acquire the third RGB image 24 (as per operation of method steps similar to steps 102-106 and 110-113 of the method 100, but wherein the normalization of the adjusted channel gains might be not performed), in view of acquiring a next fourth RGB image 24.

It will be further appreciated that, although in the above disclosed embodiment the auto-exposure module 19 of the system 10 is configured to determine and apply, in addition to the auto-exposure correction factor, the AWB correction factors, in some embodiments a separate module or unit can be provided in the system 10 to determine and apply the AWB correction factors as per the above disclosed operation of the method 100. In particular, in these embodiments the separate AWB module can be operatively connected to the auto-exposure module 19 so that one these modules: calculates the G image histogram, transforms the G histogram in the linear space, calculates the G integral, calculates the G transfer curve, calculates a line fitting the G transfer curve, calculates a slope of the fitting line, and provides the calculated slope to the other module.

The invention claimed is:

1. A method for an image acquisition system, the image acquisition system including an image sensor, and an auto-exposure module operatively connected to the image sensor to control the exposure of images acquired by the image sensor, the method comprising:
determining, by the auto exposure module, a first set of exposure parameters to acquire at least one first image;
acquiring the at least one first image using said first set of exposure parameters;
determining a target image histogram;
calculating at least one image histogram based on intensity values of the pixels of the at least one first image;
determining an integral of the or each image histogram and of the target image histogram for a range of pixel intensity values;
calculating a transfer curve for transforming the integral of the or each image histogram to match the integral of the target image histogram;
calculating a slope of a line fitting at least a portion of the transfer curve;
determining a correction factor based on the calculated slope;
adjusting said first set of exposure parameters according to said correction factor; and
acquiring at least one second image using the adjusted first set of exposure parameters.

2. The method of claim 1, comprising:
transforming the or each image histogram and the target image histogram into a linear space; and
wherein said determining an integral of the or each image histogram and of the target image histogram for a range of pixel intensity values comprises:
determining an integral of the or each transformed image histogram and of the transformed target image histogram in the linear space; and
wherein said calculating a transfer curve for transforming the integral of the or each image histogram to match the integral of the target image histogram comprises:
calculating a transfer curve for transforming the integral of the or each transformed image histogram to match the integral of the transformed target image histogram in the linear space.

3. The method of claim 1, wherein the target image histogram is a uniform image histogram.

4. The method of claim 1, wherein said at least one second image comprises a sequence of second images, and wherein the adjustment to said first set of exposure parameters is distributed across the exposure parameters for said sequence of second images.

5. The method of claim 1, wherein said first set of exposure parameters comprises at least an exposure time in combination with a gain, and wherein said adjusting said first set of exposure parameters comprises adjusting at least one of the exposure time and the gain according to said correction factor.

6. The method of claim 5, wherein said image acquisition system further includes:
   a lens assembly with variable aperture, and
   a controllable light emitting source;
   wherein said first set of exposure parameters further comprises an aperture of the lens assembly
   and an intensity of the light emitting source; and
   wherein said adjusting said first set of exposure parameters according to said correction factor comprises adjusting at least one of: the exposure time, the gain, the lens aperture and the intensity of the light emitting source according to said correction factor.

7. The method of claim 5, wherein the image acquisition system includes a plurality of color channels operatively connected to the image sensor and configured to provide respective image planes, wherein said gain comprises at least a common gain associated with the color channels.

8. The method of claim 7, wherein said first color channel is a green channel.

9. The method of claim 7, wherein said gain comprises a plurality of channel gams, each channel gain being associated with a respective one of the color channels, the method comprising:
   calculating a plurality of image histograms, each image histogram being calculated based on the intensity values of the pixels of a respective one of the image planes;
   determining a respective integral of each of the image histograms for the range of pixel intensity values;
   calculating a respective transfer curve for transforming each integral of the image histograms to match the integral of the target image histogram;
   calculating a respective slope of a line fitting at least a portion of a corresponding one of the transfer curves; and
   determining a respective adjusted channel gain for each channel based on the calculated slopes.

10. The method of claim 9 wherein said adjusting said first set of exposure parameters according to said correction factor further comprises normalizing the adjusted channel gains based on a minimum of the adjusted channel gains.

11. The method of claim 9, wherein said pixel intensity values have a full range of values from 0 to 255 and wherein said range of pixel intensity values is between about 200 and 255.

12. An image acquisition system comprising:
   an image sensor, and
   an auto-exposure module operatively connected to the image sensor to control the exposure of images acquired by the image sensor;
   the image acquisition system being configured to perform the steps of claim 1.

13. A computer program product comprising a non-transitory computer readable medium on which instructions are stored which, when executed by an image acquisition system, are configured to cause the image acquisition system to perform the steps of claim 1.

14. A method for an image acquisition system for automatic exposure correction, the image acquisition system including an image sensor, and an auto exposure module operatively connected to the image sensor to control the exposure of images acquired by the image sensor, the method comprising:
   determining, by the auto-exposure module, a first set of exposure parameters to acquire at least a first image, said first set of exposure parameters comprising at least an exposure time in combination with a gain;
   acquiring the first image using said first set of exposure parameters;
   determining a target image histogram;
   calculating a first image histogram based on the intensity values of the pixels of the first image;
   determining an integral of the first image histogram and of the target image histogram for a range of pixel intensity values;
   calculating a first transfer curve for transforming the integral of the first image histogram to match the integral of the target image histogram;
   calculating a first slope of a first line fitting at least a portion of the first transfer curve;
   determining an auto-exposure correction factor based on the calculated first slope;
   adjusting said first set of exposure parameters according to said auto-exposure correction factor; and
   acquiring at least one second image using the adjusted first set of exposure parameters.

15. An image acquisition system comprising:
   an image sensor, and
   an auto-exposure module operatively connected to the image sensor to control the exposure of images acquired by the image sensor;
   the image acquisition system being configured to perform the steps of claim 14.

16. A computer program product comprising a non-transitory computer readable medium on which instructions are stored which, when executed by an image acquisition system, are configured to cause the image acquisition system to perform the steps of claim 14.

17. A method for an image acquisition system for automatic white balance correction, the image acquisition system including an image sensor, an auto exposure module operatively connected to the image sensor to control the exposure of images acquired by the image sensor, and a plurality of color channels operatively connected to the image sensor and configured to provide respective image planes, the method comprising:
   determining, by the auto-exposure module, a first set of exposure parameters to acquire at least a plurality of image planes via the color channels, wherein said first set of exposure parameters includes at least a plurality of first channel gains, each of the first channel gains being associated with a corresponding one of a plurality of color channels;
   determining a target image histogram;
   calculating a plurality of first image histograms, each first image histogram being calculated based on the intensity values of the pixels of a corresponding one of the image planes;
   determining an integral of each of the first image histograms;
   calculating a plurality of first transfer curves for transforming the integrals of the first image histograms to match the integral of the target image histogram;

calculating a plurality of first slopes of first lines fitting at least a portion of the first transfer curves;

determining a plurality of white balance correction factors for the first channel gains based on the calculated first slopes;

adjusting each of the first channel gains according to a corresponding one of the plurality of the white balance correction factors; and acquiring at least one second image using the adjusted first channel gains.

18. An image acquisition system comprising:

an image sensor, a plurality of color channels operatively connected to the image sensor and configured to provide separate single-plane images, and an auto-exposure module operatively connected to the image sensor to control the exposure of images acquired by the image sensor;

the image acquisition system being configured to perform the steps of claim 17.

19. A computer program product comprising a non-transitory computer readable medium on which instructions are stored which, when executed by an image acquisition system, are configured to cause the image acquisition system to perform the steps of claim 17.

* * * * *